US008223080B2

(12) United States Patent
Kojima

(10) Patent No.: US 8,223,080 B2
(45) Date of Patent: Jul. 17, 2012

(54) TRANSMISSION AND RECEPTION MODULE

(75) Inventor: Haruo Kojima, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 12/791,304

(22) Filed: Jun. 1, 2010

(65) Prior Publication Data

US 2011/0057860 A1    Mar. 10, 2011

(30) Foreign Application Priority Data

Sep. 7, 2009  (JP) ................. 2009-206080

(51) Int. Cl.
*H01Q 3/00* (2006.01)
(52) U.S. Cl. ........ 343/754; 343/753; 342/368; 342/372; 342/376; 333/17.2
(58) Field of Classification Search .................. 343/753, 343/754; 342/368, 372, 376; 333/17.2
See application file for complete search history.

(56) References Cited

U.S. PATENT DOCUMENTS

| 3,249,935 | A | * | 5/1966 | Follen ..................... 342/97 |
| 4,138,678 | A | * | 2/1979 | Kirner .................... 342/173 |
| 4,724,441 | A | * | 2/1988 | Fithian et al. ............. 342/368 |
| 5,300,900 | A | * | 4/1994 | Bellantoni ................ 333/17.2 |
| 6,677,899 | B1 | * | 1/2004 | Lee et al. ................. 342/376 |
| 6,784,837 | B2 | * | 8/2004 | Revankar et al. .......... 342/372 |
| 6,822,615 | B2 | * | 11/2004 | Quan et al. .............. 343/754 |

FOREIGN PATENT DOCUMENTS

| JP | 63-131709 | 6/1988 |
| JP | 2-93779 | 7/1990 |
| JP | 11-55157 | 2/1999 |
| JP | 2005-218042 | 8/2005 |
| JP | 2006-179967 | 7/2006 |
| JP | 2006-217362 | 8/2006 |
| JP | 2006-311512 | 11/2006 |

OTHER PUBLICATIONS

Korean Office Action issued on Oct. 31, 2011, in Patent Application No. 10-2010-0044378.
Japanese Office Action issued Dec. 13, 2011, in Patent Application No. 2009-206080 (with English-language translation).

* cited by examiner

*Primary Examiner* — Tho G Phan
(74) *Attorney, Agent, or Firm* — Oblon, Spivak, McClelland, Maier & Neustadt, L.L.P.

(57) ABSTRACT

A transmission and reception module according to one embodiment of the present invention includes an antenna, a transmission circuit, a wave detection circuit, a high-frequency switch, a small-signal high-frequency diode limiter circuit, and a first power amplifier. The antenna transmits a transmission wave, or receives a reception wave. The transmission circuit is connected to the antenna via a circulator and supplies the transmission wave to the antenna. The wave detection circuit is connected to the antenna via the circulator and branches the reception wave received by the antenna to generate a control signal based on one branched reception wave. The high-frequency switch is connected to the wave detection circuit and suppresses a power of the other branched reception wave when the control signal is input thereto. The small-signal high-frequency diode limiter circuit is connected to the high-frequency switch and further suppresses the power of the other branched reception wave output from the high-frequency switch. The first power amplifier is connected to the small-signal high-frequency diode limiter circuit and amplifies the power of the other branched reception wave whose power has been suppressed by the small-signal high-frequency diode limiter circuit.

13 Claims, 3 Drawing Sheets

TRANSMISSION AND RECEPTION MODULE

CROSS REFERENCE TO RELATED APPLICATIONS

This application is based upon and claims the benefit of priority from the prior Japanese Patent Application No. 2009-206080 filed in Japan on Sep. 7, 2009; the entire contents of which are incorporated herein by reference.

FIELD

Embodiments described herein relate generally to a transmission and reception module used in a radar and the like.

BACKGROUND

A transmission and reception module used in a radar and the like transmits a desired high-frequency wave via an antenna to a measurement object, and receives a high-frequency wave reflected by the measurement object via the antenna. Thus, a distance from the module to the measurement object can be measured.

A typical transmission and reception module includes an antenna serving as transmission and reception terminals of a high-frequency wave, and a transmission circuit and a reception circuit connected to the antenna via a circulator.

In particular, the radar is required to be capable of transmitting the high-frequency wave farther, and receiving a faint reflected wave reflected by the measurement object. Therefore, an amplifier is provided in each of the transmission circuit and the reception circuit.

However, the reception circuit in particular may receive a high-frequency wave reflected by the measurement object or an obstacle existing at a very short distance in some cases. In this case, the high-frequency wave having a power exceeding a breakdown power is input to the amplifier in the reception circuit. As a result, the amplifier of the reception circuit is broken down.

Furthermore, in the case where the measurement object exists at a very short distance, the high-frequency wave is multiply reflected between the antenna and the measurement object, which causes a transmission load VSWR of the transmission and reception module to considerably deteriorate. In this case, the transmission wave is reflected by the antenna and input to the reception circuit via the circulator. In this case also, the high-frequency signal having the power exceeding the breakdown power is input into the amplifier in the reception circuit. As a result, the amplifier of the reception circuit is broken down.

Therefore, a conventional transmission and reception module is provided with a limiter circuit in which a diode is used between the circulator and the amplifier of the reception circuit. This limiter circuit suppresses a power of the high-frequency wave input to the circuit to a desired power. That is, even when the transmission and reception module receives the high-power high-frequency wave, the above problem can be solved by suppressing the power of the high-frequency wave to the desired power with the limiter circuit before being input to the amplifier.

Limiter circuits are typically provided in multiple stages to process a higher power. More specifically, a high-power high-frequency diode limiter circuit capable of processing a high-power reception wave is provided in a first stage, and a low-power high-frequency diode limiter circuit is subsequently provided.

A diode which can process a high power is used in the high-power high-frequency diode limiter circuit. However, since a high-frequency wave loss is great in the above diode, there is a problem in performance that the high-frequency wave loss is great in the high-power high-frequency diode limiter circuit. Therefore, a noise figure is deteriorated in the reception circuit having the high-power high-frequency diode limiter circuit. In this case, a low-power high-frequency wave cannot be received, and a maximum detectable range is deteriorated.

When the measurement object positioned at a short distance is measured, there is a method to avoid using the high-power high-frequency diode limiter circuit by decreasing a pulse width of the transmission wave as an operational measure. However, this method cannot deal with the prevention of an electronic wave having a large pulse width transmitted from the measurement object.

DETAILED DESCRIPTION

A transmission and reception module according to one embodiment of the present invention includes an antenna, a transmission circuit, a wave detection circuit, a high-frequency switch, a small-signal high-frequency diode limiter circuit, and a first power amplifier. The antenna transmits a transmission wave, or receives a reception wave. The transmission circuit is connected to the antenna via a circulator and supplies the transmission wave to the antenna. The wave detection circuit is connected to the antenna via the circulator and branches the reception wave received by the antenna to generate a control signal based on one branched reception wave. The high-frequency switch is connected to the wave detection circuit and suppresses a power of the other branched reception wave when the control signal is input thereto. The small-signal high-frequency diode limiter circuit is connected to the high-frequency switch and further suppresses the power of the other branched reception wave output from the high-frequency switch. The first power amplifier is connected to the small-signal high-frequency diode limiter circuit and amplifies the power of the other branched reception wave whose power has been suppressed by the small-signal high-frequency diode limiter circuit.

Hereinafter, a transmission and reception module according to one embodiment of the present invention will be described in detail with reference to the drawings.

Figure 1:
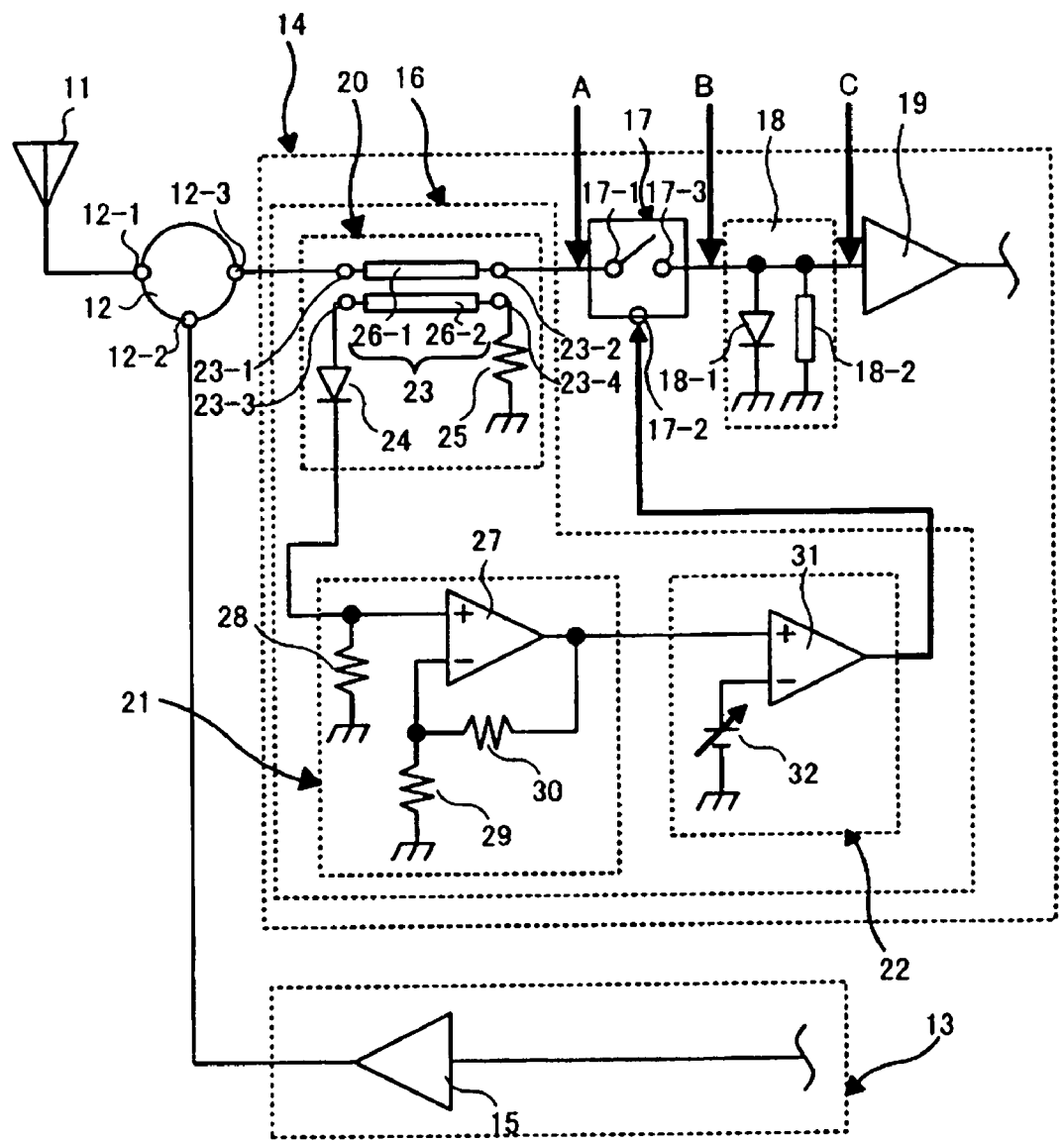
FIG. 1 is a block diagram showing a configuration of a main part of a transmission and reception module according to an embodiment of the present invention.

FIG. 1 is a block diagram showing a configuration of a main part of a transmission and reception module according to this embodiment. As shown in FIG. 1, a first port 12-1 of a circulator 12 is connected to an antenna 11 serving as a transmission and reception end of a high-frequency wave in the transmission and reception module according to this embodiment. In addition, a transmission circuit 13 is connected to a second port 12-2 of the circulator 12, and a reception circuit 14 is connected to a third port 12-3 of the circulator 12.

In the circulator 12, a high-frequency wave input to the second port 12-2 is output to the first port 12-1, and a high-frequency wave input to the first port 12-1 is output to the third port 12-3. Thus, the transmission wave output from the transmission circuit 13 is sent to the antenna 11, and the reception wave received by the antenna 11 is sent to the reception circuit 14.

The transmission circuit 13 includes a transmission system power amplifier 15. An output terminal of the amplifier 15 is connected to the second port 12-2 of the circulator 12. An input terminal of the transmission system power amplifier 15 is connected to a transmission wave generation circuit (not shown).

The reception circuit 14 has a wave detection circuit 16, a high-power high-frequency switch 17, a low-power high-frequency diode limiter circuit 18, and a reception system low noise amplifier 19. An input terminal of the wave detection circuit 16 is connected to the third port 12-3 of the circulator 12. In addition, a first output terminal of the wave detection circuit 16 is connected to an input terminal 17-1 of the high-power high-frequency switch 17, and a second output terminal of the wave detection circuit 16 is connected to a control terminal 17-2 of the high-power high-frequency switch 17.

Figure 2:
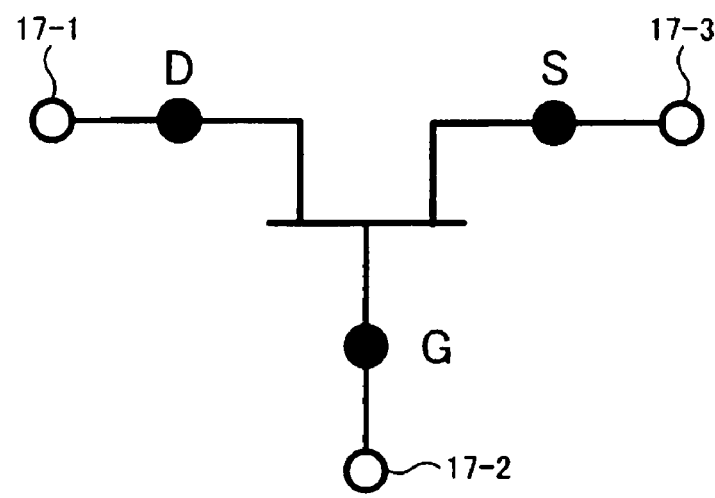
FIG. 2 is a circuit diagram showing a FET used for a high-power high-frequency switch shown in FIG. 1.

FIG. 2 is a circuit diagram specifically showing the high-power high-frequency switch 17. As shown in FIG. 2, the high-power high-frequency switch 17 is an FET. Therefore, the first output terminal of the wave detection circuit 16 is connected to a drain terminal of the FET. The second output terminal of the wave detection circuit 16 is connected to a gate terminal of the FET. For example, the FET is made of a GaN-based material.

This FET is a normally-ON type FET. In addition, this FET is a switch element in which a ratio (power suppression ratio=$10 \log_{10}(Y/X)$) between a peak power level X output in an ON state (closed state: a voltage is not applied to the gate terminal), and a peak power level Y output in an OFF state (open state: a voltage is applied to the gate terminal) has a finite value except for zero.

For example, the FET shown in FIG. 2 is a switch element having the following output characteristics: the FET has characteristics of being in the closed state when the voltage of the gate terminal is 0 V, and being in the open state when the voltage of the gate terminal is about −3V. When a reception wave having a peak power of about 10 W, for example, is input to this FET, the FET outputs a reception wave having the peak power of about 10 W in the closed state. On the other hand, the FET outputs a reception wave having the peak power of about 0.01 W in the open state. Consequently, the FET used for the switch 17 can implement power suppression of about 30 [dB].

Figure 3:
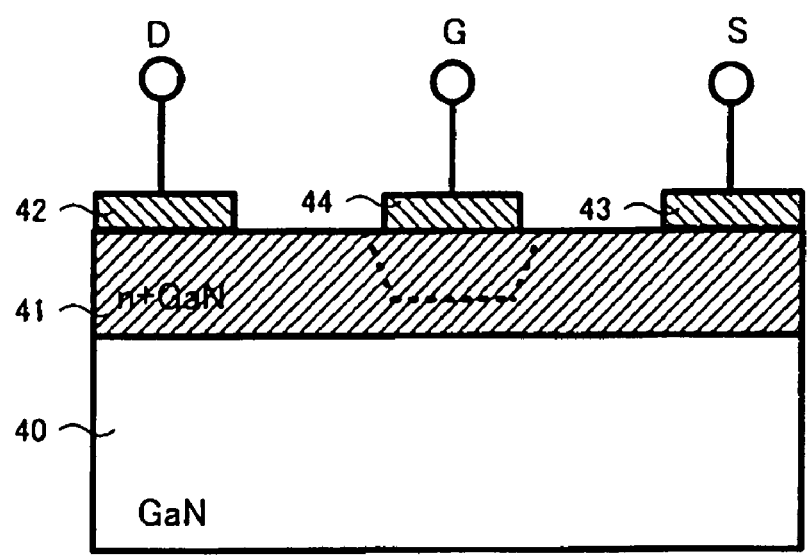
FIG. 3 is a cross-sectional view showing a simplified structure of the FET shown in FIG. 2.

FIG. 3 is a cross-sectional view showing a simplified configuration of the FET of FIG. 2. As shown in FIG. 3, an n+ GaN layer 41 is formed on a bulk GaN layer 40 in the FET. This n+ GaN layer 41 is an electron transit layer and has a thickness of about 1 to 2 μm. A drain electrode 42 and a source electrode 43 are formed on the n+ GaN layer 41 with a space between the drain electrode 42 and the source electrode 43, and a gate electrode 44 is formed between the electrodes 42 and 43.

When a voltage is not applied to the gate electrode 44 of the FET, a current flow is generated between the source and drain in the n+ GaN layer 41. Therefore, when the reception wave having the peak power of 10 W is input to the drain electrode 42, the reception wave having the peak power of 10 W is output from the source electrode 43.

However, when a voltage of about −3 V is applied to the gate electrode 44, a depletion layer 45 is formed in the n+ GaN layer 41 immediately under the gate electrode 44. Thus, a current between the source and drain is interrupted. Therefore, when the reception wave having the peak power of 10 W, for example, is input to the drain electrode 42, a reception wave having a peak power of 0.01 W is output from the source electrode 43.

The high-power high-frequency switch 17 is not limited to the FET, but any switch element having a power suppression ratio of a finite value except for zero may be employed.

Referring back to FIG. 1, an output terminal 17-3 (the source terminal of the FET shown in FIG. 2, for example) of the high-power high-frequency switch 17 is connected to an input terminal of the low-power high-frequency diode limiter circuit 18. The low-power high-frequency diode limiter circuit 18 includes a PIN diode 18-1 and a DC return circuit 18-2, and one ends of them are commonly connected to the input terminal and the output terminal of the low-power high-frequency diode limiter circuit 18. The other ends of the PIN diode 18-1 and the DC return circuit 18-2 are both grounded. The PIN diode 18-1 is a PIN diode for a so-called small signal, and has a thermal time constant τ of 50 to 100 μs and characteristics of being thermally broken down when a reception wave having a peak power of about 1 W is input beyond this thermal time constant τ. The DC return circuit 18-2 is composed of a λ/4 short circuit line, for example.

A PIN diode for a large signal may also be applied to this low-power high-frequency diode limiter circuit 18, but since an insertion loss of the PIN diode for the large signal is high, it is preferable that the PIN diode 18-1 for a small signal is applied as described above.

An output terminal of the low-power high-frequency diode limiter circuit 18 is connected to an input terminal of the reception system low noise amplifier 19. An output terminal of the reception system low noise amplifier 19 is connected to a receiving signal processing circuit (not shown).

Hereinafter, a configuration of the above-mentioned wave detection circuit 16 will be described. The wave detection circuit 16 includes a power monitor circuit 20, a wave detection-based power amplifier 21, and a comparison driver 22. Further, the power monitor circuit 20 includes a coupler 23, a rectifying diode 24, and a resistor 25.

The input terminal of the wave detection circuit 16 is an input terminal 23-1 of the coupler 23. This coupler 23 has first to third output terminals 23-2, 23-3, and 23-4 in addition to the input terminal 23-1, and includes first and second microstrip lines 26-1 and 26-2 which are close to each other, for example. One end of the first microstrip line 26-1 serves as the input terminal 23-1 of the coupler 23, and the other end thereof serves as the first output terminal 23-2 of the coupler 23. In addition, one end of the second microstrip line 26-2 serves as the second output terminal 23-3 of the coupler 23, and the other end of the second microstrip line 26-2 serves as the third output terminal 23-4 of the coupler 23.

Here, the first output terminal 23-2 of the coupler 23 is connected to the input terminal of the high-power high-frequency switch 17. That is, the first output terminal of the above-described wave detection circuit 16 is the first output terminal 23-2 of the coupler 23. In addition, the second output terminal 23-3 of the coupler 23 is connected to an input terminal of the wave detection system power amplifier 21 via the rectifying diode 24, and the third output terminal 23-4 of the coupler 23 is grounded via the resistor 25.

The wave detection system power amplifier 21 includes a first differential amplifier 27, a first resistor 28, a second resistor 29, and a third resistor 30. The second output terminal 23-3 of the coupler 23 and one end of the first resistor 28 whose other end is grounded are commonly connected to a non-inverting input terminal of the first differential amplifier 27. An inverting input terminal of the first differential amplifier 27 is grounded via the second resistor 29. Furthermore, the third resistor 30 is connected between an output terminal and the inverting input terminal of the differential amplifier 27, whereby a negative feedback circuit is formed.

Since the negative feedback circuit is provided in the wave detection system power amplifier 21 as described above, the power can be stably amplified.

The wave detection system power amplifier 21 is not necessarily required when a power level of the other reception wave branched by the coupler 23 is sufficiently high enough to operate the comparison driver 22 of the next stage.

The output terminal of the first differential amplifier 27 is connected to an input terminal of the comparison driver 22. The comparison driver 22 includes a second differential amplifier 31 and a constant voltage source 32. The output terminal of the first differential amplifier 27 is connected to a non-inverting input terminal of the second differential amplifier 31, and the constant voltage source 32 is connected to an inverting input terminal of the second differential amplifier 27. In addition, an output terminal of the second differential amplifier 31 is connected to the control terminal of the high-power high-frequency switch 17. Consequently, the output terminal of the second differential amplifier 27 serves as the second output terminal of the wave detection circuit 16.

In the transmission and reception module having the above configuration, the reception circuit 14 is operated as follows. First, the reception wave received by the antenna 11 is mostly input to the high-power high-frequency switch 17 via the wave detection circuit 16. Here, the wave detection circuit 16 extracts a part of the input reception wave, and generates a control signal to control the high-power high-frequency switch 17 based on the input wave. A power of the reception wave input to the high-power high-frequency switch 17 is partially suppressed when the control signal is input to the switch 17. Furthermore, the power of the reception wave which has been suppressed is suppressed to a power smaller than a breakdown power of the reception system low noise amplifier 19 by the low-power high-frequency diode limiter circuit 18 in the next stage of the high-power high-frequency switch 17, and the reception wave is input to the reception system low noise amplifier 19.

As described above, the reception circuit 14 can suppress the power of the high-power reception wave by the high-power high-frequency switch 17 superior in high-frequency characteristics and the diode limiter circuit 18.

Hereinafter, the operation of the reception circuit 14 will be described in detail. The description will be made with reference to FIGS. 4 and 5 as well as FIG. 1 as appropriate.

Figure 4:
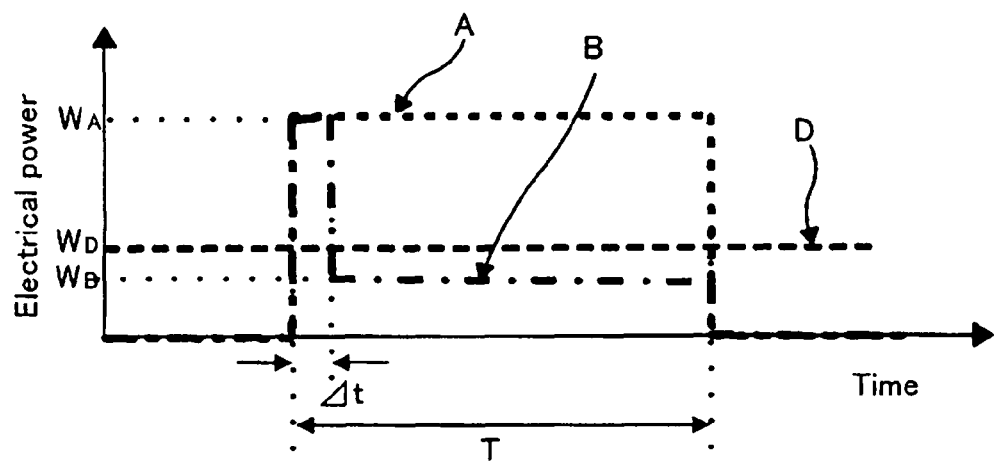
FIG. 4 is a graph showing a behavior of a peak power of a reception wave shifting with time at each of point A and point B shown in FIG. 1.
Figure 5:
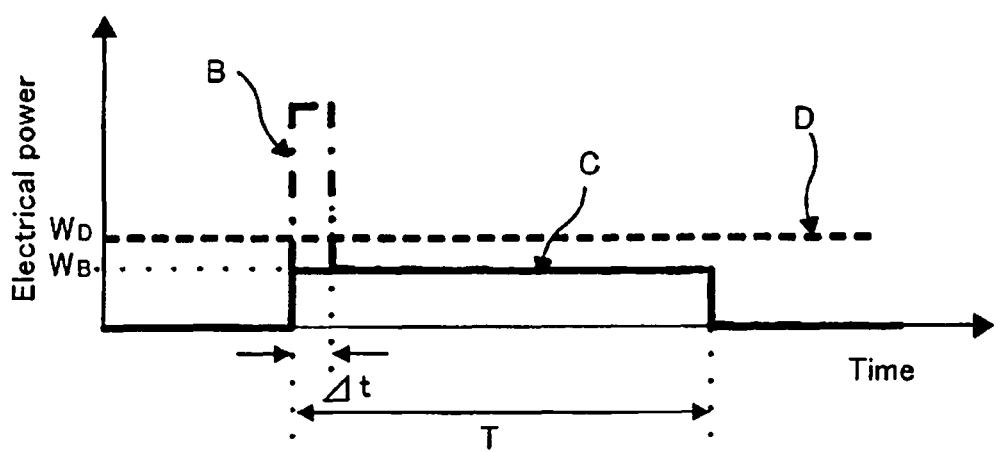
FIG. 5 is a graph showing a behavior of a peak power of a reception wave shifting with time at each of point B and point C shown in FIG. 1.

FIG. 4 shows a behavior of a peak power of the reception wave shifting with time at each of a point A and a point B in FIG. 1, in which a horizontal axis represents the time and a vertical axis represents the peak power level. FIG. 5 shows a behavior of a peak power of the reception wave shifting with time at each of the point B and a point C in FIG. 1, in which a horizontal axis represents the time and a vertical axis represents the peak power level.

First, the reception wave input to the wave detection circuit 16 and having a pulse width of T is branched by the coupler 23. One branched reception wave is input to the input terminal of the high-power high-frequency switch 17. When the one reception wave passes through the point A in FIG. 1 before being input to the high-power high-frequency switch 17, its power shifts as shown by A in FIG. 4. More specifically, as shown by A in FIG. 4, when the reception wave passes through the point A, its power level rises to $W_A$ and remains in this state for a time T and then falls to around a noise level.

The other reception wave (hereinafter, referred to as a wave detection signal) branched by the coupler 23 is rectified by the rectifying diode 24 connected to the second output terminal 23-3 of the coupler 23 and is converted to a direct current. The wave detection signal which has been converted to the direct current is input to the wave detection system power amplifier 21. The power of the wave detection signal is approximately 1/10 to 1/100 of the power of the reception wave input to the input terminal of the high-power high-frequency switch 17.

Here, the reception wave is branched by the coupler 23 as follows. That is, when the reception wave is input to the first microstrip line 26-1, an induced current is generated in the closely-arranged second microstrip line 26-2. This induced current is output from the second output terminal 23-3 of the coupler 23 as the wave detection signal.

The wave detection signal (hereinafter, referred to as a DC wave detection signal) which has been converted to the direct current by the rectifying diode 24 is input to the non-inverting input terminal of the first differential amplifier 27 in the wave detection system power amplifier 21, and its power is amplified therein. The amplified DC wave detection signal is input to the comparison driver 22 connected to the output terminal of the amplifier 27.

The amplified DC wave detection signal is input to the non-inverting input terminal of the second differential amplifier 31 in the comparison driver 22. Here, a desired voltage is applied from the constant voltage source 32 to the inverting input terminal of the second differential amplifier 31. This voltage is determined such that the high-power high-frequency switch 17 is operated when the reception wave is input to the transmission and reception module according to this embodiment. Therefore, when the FET shown in FIG. 2 is used for the high-power high-frequency switch 17, the voltage is determined such that the control signal having a voltage of about −3 V is output from the comparison driver 22. Alternatively, the voltage of the control signal may be determined by adjusting a branch ratio of the coupler 23 and an amplitude factor of the wave detection system power amplifier 21 as well as adjusting the constant voltage source 32. Thus, when the power of the reception wave input to the high-power high-frequency switch 17 is equal to or higher than the breakdown power of the PIN diode 18-1, the control signal having the voltage determined based on a difference between the voltage of the amplified DC wave detection signal and the voltage of the constant voltage source is output from the second differential amplifier 31, and input to the control terminal of the high-power high-frequency switch 17.

When the control signal is input to the control terminal 17-2 of the high-power high-frequency switch 17, the power of the reception wave input to the input terminal 17-1 of the high-power high-frequency switch 17 is suppressed and the reception wave is output from the output terminal 17-3 to the limiter circuit 18 in the next stage.

For example, it is assumed here that the FET shown in FIG. 2 is used for the high-power high-frequency switch 17, and the peak power of the reception wave input to the drain terminal of the FET is about 10 W. In this case, when the control signal having a voltage of approximately −3 V is input from the second differential amplifier 31, the FET becomes the OFF state. Accordingly, the input reception wave whose peak power is suppressed by approximately 30 dB is output from the source terminal. That is, the reception wave having the peak power of approximately 0.01 W is output from the source terminal and input to the next-stage limiter circuit 18.

When the reception wave passes through the point B in FIG. 1 before being input to the limiter circuit 18, the power thereof shifts as shown by B in FIG. 4. That is, as shown by B in FIG. 4, when the reception wave passes through the point B, its power level rises to $W_A$ and remains in this state for a time $\Delta t$ and then the power is suppressed, whereby the power level falls to $W_B$. After this state remains for a time $T-\Delta t$, the power level falls to about a noise level.

Thus, the power of the reception wave passing through the point B in FIG. 1 is not suppressed for the first time $\Delta t$ and then the peak power is suppressed to $W_B$ ($<W_A$). The reason why the power is not suppressed for the first time $\Delta t$ is as follows.

This time $\Delta t$ represents a time difference between the time when the reception wave is input to the input terminal 17-1 of the high-power high-frequency switch 17 and the time taken for the control signal to be input to the control terminal 17-2 of the switch 17 and make the switch 17 perform the desired operation, and is about 1 to 2 µs, for example. More specifically, at the point when the reception wave is input to the input terminal 17-1 of the switch 17, the control signal 17-2 is not yet input to the control terminal or even if it is input, the power of the reception wave is not suppressed because of the low operation speed of the switch 17. However, after a delay of the time $\Delta t$, the control signal is input to the control terminal 17-2 to control the switch 17, whereby the power is suppressed. Therefore, the power of the reception wave passing through the point B in FIG. 1 shifts as shown by B in FIG. 4. This time $\Delta t$ is ideally zero. In order to realize this ideal time, the wave detection signal needs to be input to the control terminal of the switch 17 via the wave detection system power amplifier 21 and the comparison driver and the switch 17 needs to be open before the reception wave is conveyed from the wave detection circuit 16 to the high-power high-frequency switch 17.

In addition, the switch 17 is the so-called normally-ON type switch. Therefore, the switch 17 is in the closed state during the time $\Delta t$ during which the control signal is not input to the switch 17. Therefore, after the reception wave having the peak power of about 10 W, for example, has been input to the switch 17, its power is not suppressed for the time $\Delta t$, and the reception wave having the peak power of about 10 W is output. However, after the time $\Delta t$, the control signal is input to the switch 17 and the switch 17 becomes the open state. Thus, after the time $\Delta t$, the peak power is suppressed by approximately 30 dB and then output.

The reception wave whose power has been suppressed by the high-power high-frequency switch 17 is input to the small-power high-frequency diode limiter circuit 18. Then, the limiter circuit 18 suppresses the power of the reception wave which has not been suppressed by the switch 17 to be smaller than a breakdown power $W_D$ of the next-stage reception system low noise amplifier 19. The reception wave whose power has been suppressed is input to the reception system low noise amplifier 19.

When the reception wave passes through the point C in FIG. 1 before being input to the reception system low noise amplifier 19, its power shifts as shown by C in FIG. 5. That is, as shown by C in FIG. 5, when the reception wave passes through the point C, the power level rises to $W_B$ and remains in this state for a time T, and then falls to about the noise level. Here, the power $W_B$ is smaller than the breakdown power $W_D$ of the reception system low noise amplifier 19. In addition, the power $W_B$ is smaller than a power value $W_C$ which is defined by the PIN diode 18-1.

Even when the power $W_B$ of the reception wave output under the state that the switch 17 is open is higher than the power value $W_C$ defined by the PIN diode 18-1, the peak power is suppressed to $W_C$ by the PIN diode 18-1.

In addition, the PIN diode 18-1 in the limiter circuit 18 is configured to suppress the power to the power $W_C$ which is smaller than the breakdown power $W_D$ of the reception system low noise amplifier 19.

Thus, the reception signal having the power level smaller than the breakdown power $W_D$ is input to the next-stage reception system low noise amplifier 19.

The limiter circuit 18 suppresses the peak power to $W_C$ by the following operation. When the high-power reception signal is input to the limiter circuit 18, a voltage is applied across both ends of the PIN diode 18-1, and the PIN diode 18-1 short-circuits. However, the voltage applied to the PIN diode 18-1 does not exceed a limit voltage determined by the characteristics of the diode 18-1. Meanwhile, when the PIN diode 18-1 short-circuits, the direct current flows through the DC return circuit 18-2 composed of the $\lambda/4$ wavelength short circuit line and the PIN diode 18-1, and the DC return circuit 18-2 opens with respect to a AC current while it short-circuits with respect to a DC current. Therefore, when the voltage applied to the PIN diode 18-1 by the reception signal exceeds the limit voltage, the reception signal is partially reflected by the limiter circuit 18, and the voltage of the PIN diode 18-1 does not exceed the limit voltage. Thus, the peak power of the reception signal is suppressed to the power $W_C$ which is determined by the limit voltage and then output from the limiter circuit 18.

When the reception wave having the peak power of 10 W, for example, is input to the switch 17, the output reception wave has the peak power of 10 W, for example, while the breakdown power of the PIN diode 18-1 is 1 W in this embodiment. However, since the time $\Delta t$ during which the peak power is input to the limiter circuit 18 is very short (about 1 to 2 µs, for example), it does not exceed the thermal time constant $\tau$ (about 50 to 100 µs, for example) of the PIN diode. Therefore, the PIN diode 18-1 is not broken down.

Thus, after the power of the reception wave is suppressed so as to be not more than the breakdown power $W_D$ of the reception system low noise amplifier by the low-power high-frequency diode limiter circuit 18, the power is amplified by the reception system low noise amplifier 19, and input to the receiving signal processing circuit (not shown).

As described above, with the transmission and reception module according to this embodiment, the power of the reception wave input to the reception circuit 14 can be suppressed to be not more than the breakdown power $W_D$ of the reception system low noise amplifier 19 used in this circuit by the high-power high-frequency switch 17 superior in high frequency characteristics and the low-power high-frequency diode limiter circuit 18, without using a high-power high-frequency diode limiter circuit. Therefore, the reception circuit 14 which can process high power can be implemented without deteriorating the noise figure of the reception circuit 14. As a result, the maximum detectable range can be prevented from being deteriorated.

The transmission and reception module according to this embodiment has been described above. However, the transmission and reception module according to the present invention is not limited to the embodiment described above. For example, the high-power high-frequency switch 17 may be any switch element other than the FET shown in FIG. 2, such as a FET, a HEMT, a PIN diode formed of a compound semiconductor such as GaAs or InP as long as it is superior in high frequency characteristics and can suppress the high power. However, since the HEMT and the PIN diode, for example, are more likely to be thermally broken down than the FET, the FET is preferably used as the high-power high-frequency switch 17 herein.

While the high-power high-frequency switch 17 is the FET which can implement the power suppression by approximately 30 dB, the power suppression is not limited to 30 dB.

In general, the coupler 23 in the power monitor circuit 20 is not limited to the above configuration as long as it can branch the input reception wave at a desired branch ratio.

The wave detecting amplifier 21 may have a configuration other than the above such as a configuration in which a plurality of differential amplifiers are connected in series, provided that it can amplify the power of a faint wave detection signal.

In addition, it is needless to say that the same effect is provided when the wave detection circuit 16 and the high-power high-frequency switch 17 are applied to the input part of the transmission and reception module.

While certain embodiments have been described, these embodiments have been presented by way of example only, and are not intended to limit the scope of the inventions. Indeed, the novel modules described herein may be embodied in a variety of other forms: furthermore, various omissions, substitutions and changes in the form of the modules described herein may be made without departing from the spirit of the inventions. The accompanying claims and their equivalents are intended to cover such forms or modifications as would fall within the scope and spirit of the inventions.

What is claimed is:

1. A transmission and reception module comprising:
    an antenna that transmits a transmission wave or receives a reception wave;
    a transmission circuit that is connected to the antenna via a circulator and supplies the transmission wave to the antenna;
    a wave detection circuit that is connected to the antenna via the circulator and branches the reception wave received by the antenna to generate a control signal based on one branched reception wave;
    a high-frequency switch that is connected to the wave detection circuit and suppresses a power of another branched reception wave when the control signal is input;
    a small-signal high-frequency diode limiter circuit that is connected to the high-frequency switch and further suppresses the power of the another branched reception wave output from the high-frequency switch; and
    a first power amplifier that is connected to the small-signal high-frequency diode limiter circuit and amplifies the power of the another branched reception wave suppressed by the small-signal high-frequency diode limiter circuit.

2. The transmission and reception module according to claim 1, wherein
    the high-frequency switch is a normally-ON type FET.

3. The transmission and reception module according to claim 2, wherein
    the normally-ON type FET includes:
    a bulk compound semiconductor layer;
    an electron transit layer formed on the bulk compound semiconductor layer and made of the same material as that of the compound semiconductor layer;
    a drain electrode and a source electrode formed on the electron transit layer with a space between the drain electrode and the source electrode; and
    a gate electrode formed between these electrodes.

4. The transmission and reception module according to claim 3, wherein
    the compound semiconductor layer is composed of GaN.

5. The transmission and reception module according to claim 3, wherein
    the normally-ON type FET suppresses a power input to the drain electrode when switched from an on state to OFF state, and outputs the suppressed power from the source electrode.

6. The transmission and reception module according to claim 1, wherein
    the wave detection circuit includes:
    a power monitor circuit that branches the reception wave received by the antenna, rectifies and outputs one branched reception wave from a first output terminal, and outputs the another branched reception wave to an input terminal of the high-frequency switch; and
    a comparison driver that is connected to the first output terminal of the power monitor circuit and generates the control signal based on a difference between a voltage of the rectified and output reception wave and a voltage of a constant voltage source, and outputs the control signal to a control terminal of the switch.

7. The transmission and reception module according to claim 6, wherein
    the power monitor circuit includes:
    a coupler that has an input terminal and at least two output terminals, in which the input terminal is connected to the circulator and one output terminal is connected to the input terminal of the high-frequency switch, and branches the reception wave input from the input terminal; and
    a diode that is connected to another output terminal of the coupler and rectifies the reception wave output from the output terminal.

8. The transmission and reception module according to claim 7, wherein
    the wave detection circuit further includes a second power amplifier connected between the diode and the comparison driver.

9. The transmission and reception module according to claim 8, wherein
    the second power amplifier includes a first differential amplifier provided with a negative feedback circuit.

10. The transmission and reception module according to claim 6, wherein
    the comparison driver includes a second differential amplifier having:
    a non-inverting input terminal connected to the second power amplifier;
    an inverting input terminal connected to the constant voltage source; and
    an output terminal that outputs the control signal.

11. The transmission and reception module according to claim 1, wherein
    the small-signal high-frequency diode limiter circuit includes a PIN diode and a DC return circuit, the PIN diode and the DC return circuit being connected to an input terminal or output terminal of the small-signal high-frequency diode limiter circuit in parallel.

12. The transmission and reception module according to claim 11, wherein
    the PIN diode is a PIN diode for a small power.

13. The transmission and reception module according to claim 1, wherein
    the first power amplifier is a low noise amplifier.

* * * * *